United States Patent
Natens

[15] 3,661,462
[45] May 9, 1972

[54] SPECTROPHOTOMETER FOR MEASURING THICKNESS OR WEIGHT OF WATER-CONTAINING COATINGS

[72] Inventor: Luc Yves Natens, Berchem, Belgium
[73] Assignee: Gevaert-AGFA N.V., Mortsel, Belgium
[22] Filed: Apr. 23, 1970
[21] Appl. No.: 31,189

[30] Foreign Application Priority Data

Apr. 23, 1969 Great Britain......................20,766/69

[52] U.S. Cl. ..........................356/51, 250/43.5 R, 250/226, 356/96, 356/188, 356/204
[51] Int. Cl......................................G01m 21/34, G01j 3/42
[58] Field of Search .......................................356/51, 96–98, 356/204, 205, 188; 250/43.5 R, 226

[56] References Cited

UNITED STATES PATENTS 3,413,482  11/1968  Ling........................................250/43.5
3,441,351  4/1969  Bell et al..................................356/175

Primary Examiner—Ronald L. Wibert
Assistant Examiner—V. P. McGraw
Attorney—William J. Daniel

[57] ABSTRACT

The thickness and/or weight of a water-containing composition is measured by an infrared spectrophotometer wherein the attenuation of radient energy at a measuring wavelength which is substantially absorbed by the coating composition is compared with the attenuation of radient energy at a second reference wavelength not substantially absorbed by the coating composition.

9 Claims, 8 Drawing Figures

SPECTROPHOTOMETER FOR MEASURING THICKNESS OR WEIGHT OF WATER-CONTAINING COATINGS

The present invention relates to a spectrophotometer wherein the measurement of the spectral absorption of a medium occurs by the comparison of the attenuation of radiant energy at a wavelength which is subject to absorption by said medium, with the attenuation of radiant energy at a wavelength which is not, or almost not, subject to absorption by said medium. The invention relates in particular to an infrared waterband meter for measuring the coat weight, or the thickness, of layers which are applied to flexible webs, e.g. in the manufacture of wrapping or, in particular, of photographic and other recording materials.

It is known that water shows several absorption maxima in the infra-red spectrum. For measurements of water layers with a thickness in the range of 10 to 100 $\mu$m, the absorption at a wavelength of 1.96 $\mu$m offers an interesting compromise between the sensitivity of the measurement and the difficulties in the construction of the apparatus. Since accurate measurements cannot be performed at this wavelength on account of unreliabilities in the radiation sources and the detectors, the ratio of the attenuation of radiation at 1.96 $\mu$m is determined in practice versus that of one or more wavelengths in the range of said water absorption which, however, are not or not substantially influenced by the presence of water.

When the measurement occurs according to the compensation method, wherein the position of a measuring wedge in the light beam, which is reflected or transmitted by the sample to the detector, is controlled by a servomotor so that the radiant intensity impinging on the detector is constant at equilibrium of the system, deficiencies in the linearity of the response of the detector are overcome.

Apparatus operating according to the mentioned compensation method suffer, however, from two serious drawbacks.

First, their response is relatively slow because of the displacements of the measuring wedge involved before the equilibrium is reached. Second, the reliability is not very good since these apparatus comprise a delicate optical-mechanical beam-split system, wherein two optical beams are treated separately and in consequence thereof can be disturbed in a different way.

According to the present invention an infrared waterband meter, or more generally, a spectrophotometer of the type described, is provided, which has a simple optical system and which has a quick response, say less than 0.02 sec.

The spectrophotometer according to the invention wherein the measurement of the spectral absorption of a medium occurs by the comparison of the attenuation of radiant energy at a first wavelength hereinafter called the measuring beam which is subject to substantial absorption by the medium with the attenuation of radiant energy, at a second wavelength called the reference beam which is substantially not subject to absorption thereby, comprises:

a. a radiant energy detector,
b. a radiant energy source for directing radiant energy in at least the mentioned first and second wavelengths towards said medium so that said energy after impingement thereon is received on said detector,
c. filter means in the radiation path from the source to the detector and arranged to alternatively transmit radiation at said first wavelength and radiation at least at said second wavelength,
d. a measuring wedge mounted for introduction in the radiation beam as radiation in one of said wavelengths is transmitted to the detector and which progressively alters the amount of transmitted radiant energy as it moves through the radiation beam,
e. means for producing a first electric signal which is proportional to radiant energy received on the detector at the wavelength which is not attenuated by said photographic wedge and means for storing said signal,
f. means for producing a second electric signal which is proportional to radiant energy received on the detector at the wavelength which is progressively altered by the said measuring wedge,
g. means for comparing said second electric signal with said first one and for detecting the equality of both said electric signals, and
h. means for producing at said equality an indication of the position taken by the measuring wedge at said moment.

The term "wavelength" as used in the present description may denote the peak of a narrow wavelength range, e.g. a measuring beam at 1.96 $\mu$m or a reference beam at 1.71 $\mu$m, but said term may also apply to a wider wavelength range, e.g. a reference beam at a wavelength band from 1.79 to 2.17 $\mu$m.

The term "radiation source" covers the element as such which produces radiant energy, but it includes also additional filter means which may be provided in order to limit the wavelength or wavelengths wherein radiant energy is provided.

By the statement that a filter transmits radiation at a certain wavelength it is meant that said filter does not substantially transmit radiation at other wavelengths or at least does not transmit radiation at wavelengths which would interfere with other wavelengths used in the performance of the measurement according to the invention.

In the comparison of the said two electric signals, the radiation which is transmitted when the measuring wedge is in the radiation path, may be the measuring as well as the reference radiation beam.

Thus, in one system the electric signal which is proportional to the reference radiation beam is stored and compared with the electrical ramp function which is generated by the measuring wedge passing through the measuring radiation beam.

In the other system, the electric signal which is proportional to the measuring radiation beam is stored and compared with the ramp function which is produced when the measuring wedge passes through the reference radiation beam.

The measurement which is carried out by means of the apparatus according to the present invention can be done in transmission or by reflection, and in this respect the statement that the radiant energy is received on the detector after impingement on the medium applies to the case wherein said energy is reflected by the medium as well as to the case wherein the energy is transmitted thereby.

Although the invention has been particularly developed in connection with the thickness measurements of silver halide and antistress layers in the manufacturing of light-sensitive photographic material, it will be apparent that the invention is not limited to this particular application and that many other applications of the apparatus according to the invention are possible.

The invention is described hereinafter with reference to the drawings wherein.

Figure 6:
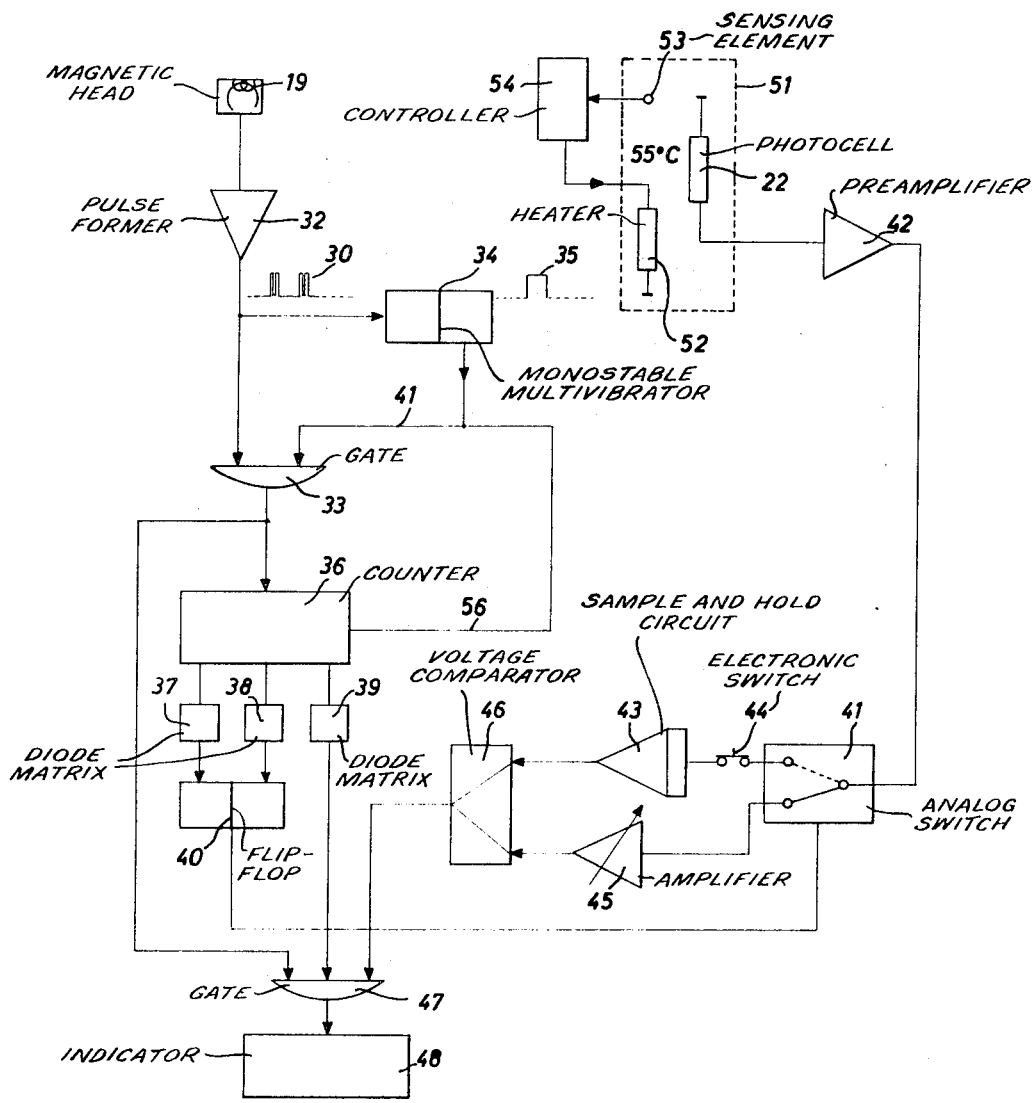
FIG. 6 is the electric circuit of the apparatus.

Labels for numerical designations in FIG. 6.
19 = magnetic head
22 = photocell
30 = pulse train from head 19
32 = pulse former
33 = gate
34 = monostable multivibrator
35 = rectangular output pulse 36 = counter
37 = diode matrix
38 = diode matrix
39 = diode matrix
40 = flip-flop
41 = analog switch
42 = preamplifier
43 = sample and hold circuit
44 = normally closed electronic switch
45 = amplifier
46 = voltage comparator
47 = gate
48 = indicator
51 = photo-cell housing
52 = heater
53 = sensing element
54 = controller.

Figure 1:
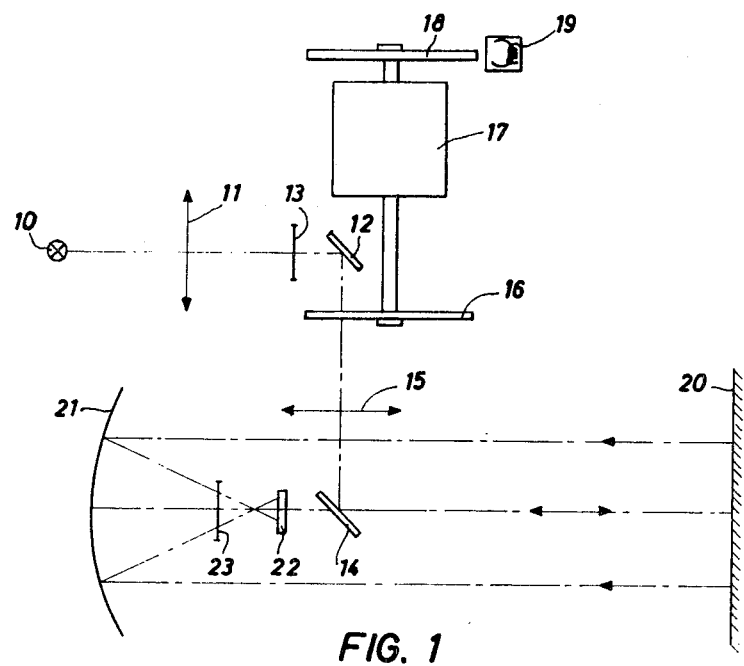
FIG. 1 is the optical arrangement of the apparatus according to the invention for carrying out the measurement by reflection.

In the arrangement shown in FIG. 1 the radiant energy from a source 10, in the present case a conventional incandescent low voltage bulb of 15 Watt fed by a stabilized power supply, is focused by a converging lens 11 onto a mirror 12. An infrared filter 13 transmits a wavelength range from 1.79 to 2.17 $\mu$m. The beam which is reflected by the mirror 12 is focused on a mirror 14 by the lens 15. The spectral composition of the radiation beam between both said mirrors is modified by a filter disk 16 which is mounted at one extremity of the shaft of an electric motor 17. At the other extremity the motor shaft is provided with a narrow drum 18 the periphery of which is provided with a length of magnetic tape on which a magnetic signal has been recorded so that upon rotation in front of a magnetic head 19 electric impulses are generated. Further details on the filter disk are given hereinafter with reference to FIGS. 3 and 4.

The radiation beam which is directed by the mirror 14 onto the water-containing layer 20, e.g. a silver halide gelatin layer which has just been coated onto a paper or film support, is partly reflected and focused by a concave mirror 21 onto the lead sulfide photo-cell 22. An infra-red filter 23 limits the response of the photo-cell to radiation with a lower wavelength of 0.9 $\mu$m. The upper wavelength limit is focused by the characteristics of the photo-cell itself at longer wavelengths. The photo-cell 22 is actually mounted in a housing 51, the temperature of which is kept thermostatically at 55° C. by means of a heater 52, and a sensing element 53 driving the controller 54 (FIG. 6).

Figure 2:
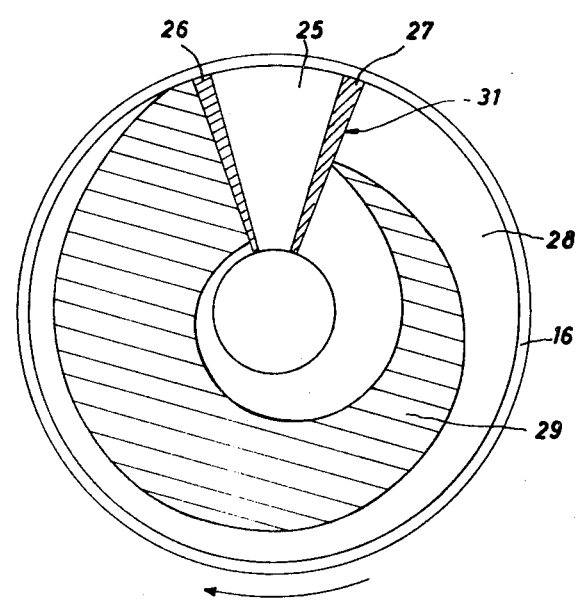
FIG. 2 is the filter disk for carrying out the measurement at two selective wavelengths.

The filter disk 16 is shown in detail in FIG. 2. It is composed of a circular glass disk onto which the following filters are provided.

An interference filter 25 which extends over about 30 angular degrees of the disk, which transmits a wavelength of 1.71 $\mu$m, and the boundaries of which are determined by the radiation absorbing small sectors 26 and 27.

An interference filter 28 which occupies the remaining angular part of the disk and which transmits radiation at a wavelength of 1.96 $\mu$m. Over said filter 28 a continuous grey wedge 29 is provided the density of which increases linearly as a function of the angular position. The representation of said wedge in the drawing is merely diagrammatical and actually the width of the wedge is constant according to the radius of the disk.

Figure 3:
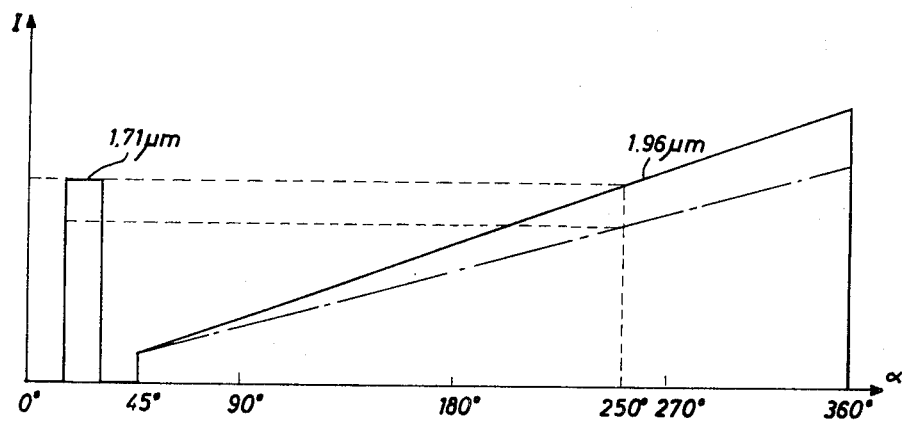
FIG. 3 is a diagram which shows the output current I of the photo-cell as a function of the angular position of the filter disk.
Figure 4:
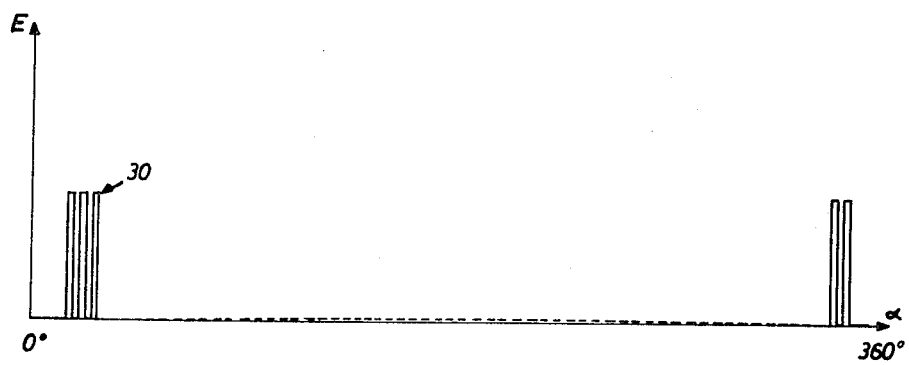
FIG. 4 is a diagram showing the impulses E produced as a function of the angular position of the filter disk.

The output of the arrangement according to FIG. 1 is shown in the diagrams of FIGS. 3 and 4.

In the diagram of FIG. 3 the output current I of the photo-cell is plotted versus the angular position $\alpha$ of the filter disk. For the purposes of the present description the radius which is indicated by the numeral 31 in FIG. 2 constitutes the zero angular position of the disk, the rotation of the disk occurring in clockwise direction.

The intensity of radiation at 1.71 $\mu$m which is received on the photo-cell is represented by the first part of the curve while the intensity of radiation at 1.96 $\mu$m is represented by the sloping part of the curve.

The maximum current at 1.71 $\mu$m, i.e. the reference signal, is determined by the characteristics of the optical system, the intensity of the light source, the sensitivity of the photo-cell and the occasional absorption by the medium to be measured, in the present case the layer 20.

The slope of the current curve at 1.96 $\mu$m, called hereinafter the measuring signal, is determined by the parameters mentioned hereinbefore in connection with the reference signal and by the I.R.-absorption of the layer 20.

The pulse train 30 which is produced by the magnetized drum 18 is shown in the diagram of FIG. 4. The starting position of a pulse series is marked by a small zone wherein no impulses are provided, in the present example the angular position composed between 0 and 15 angular degrees.

The electric circuit for carrying out the measurement is represented in FIG. 6.

The electric signals which are produced in the magnetic playback head 19 are amplified and given an appropriate shape in the pulse former 32. The pulse train thus formed is passed to a gate circuit 33 which is controlled by a monostable multivibrator 34. The multivibrator in its turn is controlled by the impulses from the pulse former 32 and acts as a pulse stretcher so that no output is provided during the pulse train, but that a marked rectangular output pulse 35 is produced during the time the impulse train is held off. This time corresponds almost to the angular position of the disk comprised between 0 and 15 angular degrees. The leading edge of the signal 35 controls the closing of the gate 33, whereas the trailing edge thereof controls the opening of the gate and also the resetting of the BCD counter 36 over line 56.

Three diode matrices 37, 38 and 39 are connected to the outputs of the counter 36. At the 10th impulse received from the counter 36 the matrix 37 controls the closing of the flip-flop circuit 40 whereas the matrix 38 controls the opening of the circuit 40 at the 15th impulse.

The output signal of the flip-flop circuit controls the analogue switch 41 in such a way that during the interval comprised between the 10th and the 15th impulse the switch takes the position as shown in broken lines. The output signal of the photo-cell 22, which has been amplified by a preamplifier 42, is fed to the sample-and-hold circuit 43 over the closed electronic switch 44.

After the 15th impulse, the switch 41 is put in the position as shown in a drawn line so that over an amplifier 45 with adjustable feedback loop the signal of the photo-cell is connected to the voltage comparator circuit 46. At the same time the contact of switch 44 was broken so that the reference signal at 1.71 $\mu$m remains stored in the circuit 43.

The third matrix 39 controls the opening of the gate circuit 47 at the receiving of the 30th impulse, so that up from said moment the impulses from the gate circuit 33 are counted and displayed in the circuit 48. At that very moment the filter transmitting the 1.9 $\mu$m wavelength has entered the radiation path, see the angular position of about 45° in FIG. 3, so that the proper measuring starts. In the voltage comparator 46 the intensity of the measuring signal at 1.96 $\mu$m is continuously compared with the intensity of the reference signal at 1.71 $\mu$m and as equality is reached, in the present case at an angular position of the filter disk at 250°, an impulse is produced by the trigger which controls the closing of the gate 47. The number of impulses which is displayed by the device 48 corresponds to the rotation of the filter disk after the measuring wedge 29 has entered the radiation beam, and gives an unequivocal indication about the waterband absorption, i.e. the thickness of the measured layer. The reading of the measured thickness may be done by means of a calibration chart on which thicknesses are plotted as a function of the number of digits displayed, but it will be understood that the apparatus can be arranged to provide, on an appropriate calibrated scale, a direct reading of the measured thickness or of the relative deviation therefrom.

The output is linear with the measured thickness, because the wedge is linear in density and, as known, thickness and density are linearly related to each other.

In case aging of the light source or the photo-cell, or any other change in the optical system causes changes in the output current of the photo-cell, up to a given extent, the measurement result will not be altered virtually since the variations in the reference and in the measuring light beam equal each other so that comparison of the corresponding electric signals leads to the same measuring result. This is illustrated by the two curves in dash and dot lines in FIG. 3 and it can be seen in the graph that the horizontal line which is drawn through the new level of the reference signal at 1.71 μm intersects the curve of the measuring signal at 1.96 μm at a point which corresponds to the same angular position of the filter disk.

The waveforms which have been shown in FIG. 3 are a theoretical approach only and have been chosen instead of the actual signal representation in order to facilitate the description of the apparatus.

Thus, it will be understood that the reference signal at 1.7 μm does not have a square waveform as shown but instead thereof has a form which rises and lowers more continuously as the filter moves into and out of the radiation path.

The measuring signal at 1.96 μm, generally, will not start near the zero level, but instead thereof will start at a value only slightly lower than the expected level of the reference signal and will end at a value slightly higher. In this way the accuracy of the measurement is greatly increased although the thickness range which can be measured is restricted thereby.

The following parameters illustrate the apparatus for one particular application.

Filter disk:
diameter 70 mm
revolutions per second 50
Wedge:
linear continuous wedge
range from 1.00 to 1.25 D
independent linearity : 0.25 percent
angular extension on the filter disk : 310°
Impulses:
number of impulses over the measuring angle of 310° = 700.
Measurement:
range: ≈ 20–30 pm $H_{20}$ (dependent on the composition of the layer)
access time is smaller than 20 msec.
resolving power 1/700
accuracy : 0.25 %.

The calibration of the apparatus is done in practice by means of samples the thickness and the water content of which are exactly known. The desired measuring range is determined by the density range of the wedge 29.

The desired measuring level, i.e. the nominal thickness, may be determined by a neutral grey filter which may be provided on the filter which determines the reference signal, or by adjusting the amount of feedback in the amplifier 45.

Another method of carrying out the calibration of the apparatus consists in continuously measuring the thickness of a freshly coated layer the thickness of which is periodically increased and decreased with a determined value by adjustment of the coating device.

When the frequency of the periodic changes is low, say one period is greater than 100 seconds, and the variations of the adjustment of the coating device are small, and the measuring results are obtained according to known correlation techniques, this method leads to satisfactory results.

In the construction of the apparatus according to the embodiment described hereinbefore, one element may give rise to difficulties, viz. the interference filter for transmitting the wavelength of 1.96 μm. Said filter occupies a considerable area on the filter disk and the filter characteristics may not be uniform along the complete measuring angle.

Figure 5:
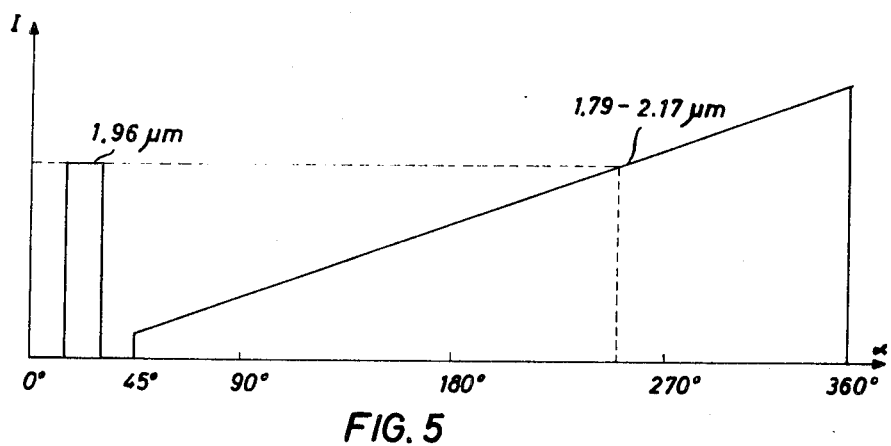
FIG. 5 is a diagram which shows the output current I of the photo-cell for a measurement occurring at one selective wavelength and at a broader band.

An apparatus which is improved in this respect is described hereinafter with reference to FIG. 7 wherein an arrangement is described for carrying out the measurement in transmission and with reference to FIG. 8 wherein the improved filter disk is shown and to FIG. 5 which shows the output of the system.

The basic operation of the apparatus does not differ from that of the apparatus described hereinbefore since still a comparison is done of the attenuation of radiant energy at a first wavelength which is subject to substantial absorption by the medium with the attenuation of radiant energy at a second wavelength which is substantially not subject to absorption thereby, but the filter which determines the mentioned first wavelength, e.g. of 1.96 μm, now occupies the small angular part of the filter disk, whereas the second wavelength is determined by a stationary filter with a relative broad band of 1.79 to 2.17 μm which includes also the first wavelength, and the corresponding greater angular part of the filter disk carries no spectral filter but only the measuring wedge 29 and a uniform neutral density filter (not shown) of a density of about 1.5. The object of said neutral grey filter is to absorb the major portion of radiation transmitted in the broad wavelength band of 1.79 to 2.17 μm in order to make that the energy quantum transmitted in said band is about equal to that which is transmitted in the narrow band of 1.96 μm. The electric signal which corresponds to the 1.96 μm wavelength, i.e. the measuring signal, is stored in the sample and hold amplifier circuit 43 whereas the measuring signal which corresponds to the second wavelength and the value of which is a function of the position of the wedge, is compared with the mentioned first electric signal.

Figure 7:
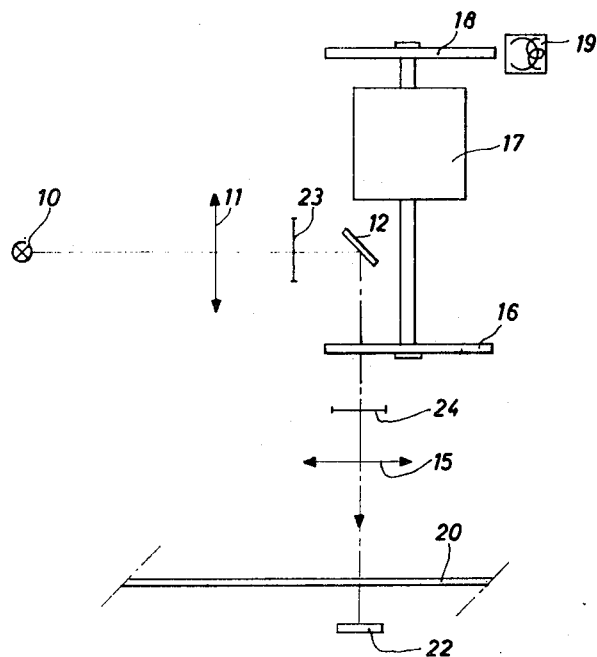
FIG. 7 is the optical arrangement for carrying out the measurement in transmission.
Figure 8:
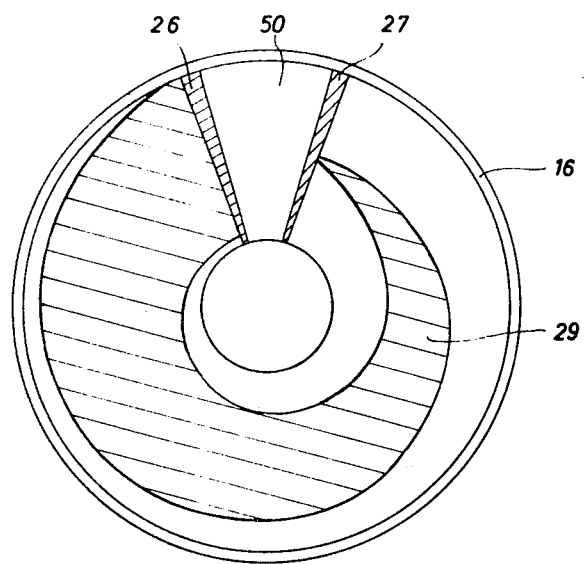
FIG. 8 is the filter disk for carrying out the measurement at one selective wavelength and at one broader band.

Referring to FIG. 7, the radiation from a source 10 is focused by a lens 11 onto a mirror 12 and reflected thereby onto the lead-sulfide photo-cell 22 through a focusing lens 15. Filters 23 and 24 determine the transmitted radiation band which extends from 1.79 to 2.17 μm. The filter disk 16 is provided with an interference filter 50 which transmits the measuring beam at 1.96 μm and the boundaries of which are determined by absorbing sectors 26 and 27.

The remaining angular part of the disk has no specific spectral absorption but is only provided with a continuous wedge 29 which is equal to that described in the apparatus according the first embodiment and with the mentioned neutral density filter.

In the operation of the apparatus, first the measuring beam at 1.96 μm is transmitted and the corresponding electric signal is stored in the circuit 43. Thereafter the switch 41 is put in the lower position so that the electric signal which is representative for the reference radiation beam may be compared with the stored measuring signal.

It will be apparent that theoretically the described technique cannot lead to perfect results since the reference radiation beam, which should not substantially be absorbed by the medium includes the 1.96 μm wavelength which is precisely subject to substantial absorption by the medium.

The sensitivity loss which is introduced in the described way in the measurement is, however, negligible, since the variations in the amount of radiation which may occur at the wavelength of 1.96 μm are very small in comparison with the amount of radiation which is transmitted in the 1.79 to 2.17 μm band.

The measurement which was carried out by means of the described apparatus covers an area of about 2 cm² only of the measured layer.

In the practical application of the invention it is thus possible to measure the thickness of a layer being coated on a paper or film web of conventional width, say 1.24 m, in the longitudinal direction by locating the radiation source and the detector about centrally of the web, or in the transverse direction by making the radiation source and the detector to scan transversally of the web. In the mentioned way, a longitudinal, respectively a transverse thickness profile of the web coating may be plotted.

Additionally, the apparatus according to the invention may be used in the measurement of the thickness of two layers which are coated at the same time or which are coated almost immediately one after another so that there is no occasion of separately measuring the thickness of the first coated layer. The measurement of the distinct thickness of two such layers is possible when the spectral absorption, more particularly the average infrared density, of both layers is different.

In the case of double coating of e.g. a light-sensitive emulsion layer and an antistress layer thereon, the measurement may occur as follows.

The average infrared density of the antistress layer is almost zero, since said layer contains substantially water.

The infrared density of the emulsion layer is relatively important since the infrared light is considerably diffused by the emulsion ingredients.

When thus the thickness of both layers is measured by 2 meters, e.g. an infrared densitometer operating at a wavelength band from 0.9 to 1.1 $\mu$m, and a waterband meter according to the present invention operating e.g. at 1.96 $\mu$m, the waterband meter provides an indication of the thickness of both said layers whereas the I.R.-meter indicates directly the thickness of the emulsion layer. The thickness of the antistress layer may be differentially calculated from both the measured values.

The invention is not limited to the described embodiments but other electronic circuits which may serve to indicate the angular position of the measuring wedge at the moment of equality of the signals from the reference and the measuring beams, other optical arrangements for determining the measuring radiation beam and the reference radiation beam(s), etc., fall within the scope of the present invention.

I claim:

1. A spectrophotometer wherein the measurement of the spectral absorption of a medium occurs by comparison of the attenuation of radiant energy at a first wavelength which is subject to substantial absorption by the medium with the attenuation of radiant energy at a second wavelength which is substantially not subject to absorption thereby, comprising
   a. a radiant energy detector,
   b. a radiant energy source for directing radiant energy in at least the mentioned first and second wavelengths towards said medium so that said energy after impingement thereon is received on said detector,
   c. filter means disposed in the radiation path between the source and the detector and arranged to alternatively transmit radiation at said first wavelength and radiation at least at said second wavelength,
   d. a measuring wedge mounted for movement across the radiation beam while the radiation in one of said wavelengths is transmitted to the detector for progressively altering the amount of transmitted radiant energy as it moves through the radiation beam,
   e. means for producing a first electric signal of a magnitude proportional to the radiant energy received on the detector at the wavelength which is not attenuated by said measuring wedge and means for storing said signal,
   f. means for producing a second electric signal of a magnitude proportional to the radiant energy received on the detector at the wavelength which is progressively altered by the said measuring wedge,
   g. means for comparing said second electric signal with said first one and for detecting when the two electric signals reach equal magnitude, and
   h. means effective when said equality is detected for producing an indication of the position of the measuring wedge at said moment.

2. A spectrophotometer according to claim 1, wherein said filter means comprises a filter holder which is mounted for continuous rotation through the radiation beam and including a first filter transmitting radiation at said second wavelength which remains in the radiation beam for a small angular displacement of the filter holder and a second filter transmitting radiation at said first wavelength which remains in the radiation beam for a substantial angular displacement of the filter holder.

3. A spectrophotometer according to claim 1, wherein said filter means comprises
   a. a filter holder mounted for continuous rotation through the radiation beam, said holder carrying a first filter transmitting radiation at said first wavelength which remains in the radiation beam only for a minor angular displacement of the filter holder, said filter holder transmitting for the remaining major part of its angular displacement all of the radiant energy of the source, and
   b. a second filter fixed in the radiation beam which transmits radiation at said second and said first wavelength.

4. A spectrophotometer according to claim 3, wherein the limits of said second wavelength extend almost symmetrically with said first wavelength.

5. A spectrophotometer according to claim 2 wherein said measuring wedge is mounted for introduction into the radiation beam while the first filter, which remains in the radiation beam over only a small angular displacement of the filter holder, is outside of the radiation beam.

6. A spectrophotometer according to claim 2, wherein said measuring wedge is mounted on said filter holder.

7. A spectrophotometer according to claim 1 wherein said means for producing an indication of the position of the measuring wedge at the moment of equality of said two electric signals comprises:
   a. a pulse generator,
   b. a pulse counter, and
   c. control means controlling said pulse counter to begin counting pulses from said pulse generator at the moment the measuring wedge enters into the radiation beam, to end said counting at the moment of equality of the electric signals and indicate the number of pulses counted as an indication of the wedge position, and to reset the counter to zero prior to reconnection to the pulse generator.

8. An infrared waterband meter for measuring the thickness of a water-containing coating applied to a substrate comprising
   a. a source for directing radiant energy at a measuring wavelength of 1.96 $\mu$m and at a different reference wavelength which is substantially not absorbed by the coating composition,
   b. a detector for receiving the energy transmitted or reflected by the coating after partial absorption thereby,
   c. a circular filter holder carrying over a substantial angular part a filter transmitting only the 1.96 $\mu$m wavelength radiation and over a small angular part a filter transmitting only the reference waveband radiation, the filter transmitting the 1.96 $\mu$m wavelength radiation including a measuring wedge, and the filter holder being mounted for rotation to successively pass said filters through the radiation path,
   d. means for producing a first electric output signal proportional to the amount of radiant energy impinged at 1.96 $\mu$m measuring wavelength on the detector, and means for storing said signal,
   e. means for producing a second electric output signal proportion to the amount of radiant energy impinged at said reference wavelength on the detector,
   f. means for comparing said two output signals and for triggering a voltage comparator at the moment said output signals are equal,
   g. a pulse generator,
   h. a pulse counter,
   i. and means for connecting said pulse counter to said pulse generator at the moment the measuring wedge enters into the radiation beam, said counter being preset just prior to its connection in the circuit, disconnecting the counter from the pulse generator in response to the triggering of said voltage comparator, and for re-setting said counter prior to reconnection to the pulse generator.

9. An infrared waterband meter for measuring the thickness of a water-containing coating applied to a substrate, comprising
   a. a radiation source for directing radiant energy at a measuring wavelength of 1.96 $\mu$m and at a reference waveband from 1.79 to 2.17 $\mu$m to the coating,
   b. a detector for receiving the energy which is transmitted or reflected by the coating after partial absorption thereby, c. a circular filter holder carrying over a small angular section a filter transmitting the 1.96 μm wavelength, the remaining angular part of the filter holder showing no particular spectral absorption and a measuring wedge of neutral density, said filter holder being mounted for rotation to successively pass said 1.96 μm filter and said measuring wedge through the radiation path, d. a stationary filter in the radiation path which transmits radiation from 1.79 to 2.17 μm, e. means for producing a first electric signal proportional to the amount of radiant energy impinged at said measuring wavelength on the detector, and means for storing said signal, f. means for producing a second electric signal proportional to the amount of radiant energy impinged at said reference wavelength on the detector, g. means for comparing the magnitude of said two signals and for triggering a voltage comparator at the moment they reach equality, h. a pulse generator, i. a pulse counter, j. and means for connecting said pulse counter to said pulse generator at the moment the measuring wedge enters into the radiation beams, said counter being preset just prior to its connection in the circuit, disconnecting the counter from the pulse generator in response to the triggering of said voltage comparator, and for re-setting said counter prior to reconnection to the pulse generator.

* * * * *